United States Patent
Muhamed et al.

(10) Patent No.: US 10,699,715 B1
(45) Date of Patent: Jun. 30, 2020

(54) TEXT INDEPENDENT SPEAKER-VERIFICATION ON A MEDIA OPERATING SYSTEM USING DEEP LEARNING ON RAW WAVEFORMS

(71) Applicant: Alphonso Inc., Mountain View, CA (US)

(72) Inventors: Aashiq Muhamed, Mountain View, CA (US); Susmita Ghose, Mountain View, CA (US)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 16/773,427

(22) Filed: Jan. 27, 2020

Related U.S. Application Data

(60) Provisional application No. 62/954,130, filed on Dec. 27, 2019.

(51) Int. Cl.
*G10L 17/18* (2013.01)
*G06N 3/04* (2006.01)
*G10L 17/04* (2013.01)
*G10L 17/00* (2013.01)

(52) U.S. Cl.
CPC ............... *G10L 17/18* (2013.01); *G06N 3/04* (2013.01); *G10L 17/005* (2013.01); *G10L 17/04* (2013.01)

(58) Field of Classification Search
CPC ....... G10L 17/18; G10L 13/08; G06N 3/0472; G06N 3/082; G06N 3/08; G06T 7/593; G06T 1/0092; H04N 19/124; G06F 17/277; G06F 17/289; G06K 9/4604; G06K 9/6259
See application file for complete search history.

(56) References Cited

U.S. PATENT DOCUMENTS

| | | | |
|---|---|---|---|
| 10,068,557 B1* | 9/2018 | Engel | G10H 1/0041 |
| 10,599,686 B1* | 3/2020 | Busbridge | G06F 16/288 |
| 2018/0005343 A1* | 1/2018 | Rhoads | G06T 7/74 |
| 2019/0005670 A1* | 1/2019 | DeTone | G06K 9/00201 |

(Continued)

OTHER PUBLICATIONS

Zhou et al., "CNN With Phonetic Attention for Text-Independent Speaker Verification", ASRU, Dec. 1, 2019. (Year: 2019).*

(Continued)

*Primary Examiner* — Anne L Thomas-Homescu
(74) *Attorney, Agent, or Firm* — Pantich Schwarze Belisario & Nadel LLP

(57) ABSTRACT

An artificial neural network architecture is provided for processing raw audio waveforms to create speaker representations that are used for text-independent speaker verification and recognition. The artificial neural network architecture includes a strided convolution layer, first and second sequentially connected residual blocks, a transformer layer, and a final fully connected (FC) layer. The strided convolution layer is configured to receive raw audio waveforms from a speaker. The first and the second residual blocks both include multiple convolutional and max pooling layers. The transformer layer is configured to aggregate frame level embeddings to an utterance level embedding. The output of the FC layer creates a speaker representation for the speaker whose raw audio waveforms were inputted into the strided convolution layer.

3 Claims, 5 Drawing Sheets

Speaker Verification Architecture

(56) References Cited

U.S. PATENT DOCUMENTS

| | | | |
|---|---|---|---|
| 2019/0005976 A1* | 1/2019 | Peleg | G10L 25/57 |
| 2019/0108411 A1* | 4/2019 | Liu | G06K 9/3233 |
| 2019/0114511 A1* | 4/2019 | Gao | G06K 9/6259 |
| 2019/0130213 A1* | 5/2019 | Shazeer | G06T 3/4053 |
| 2019/0149834 A1* | 5/2019 | Zhou | H04N 19/44 |
| | | | 348/473 |
| 2019/0156206 A1* | 5/2019 | Graham | G06F 16/90335 |
| 2019/0156210 A1* | 5/2019 | He | G06N 3/0454 |
| 2019/0236440 A1* | 8/2019 | Ho | G06N 3/084 |
| 2019/0279074 A1* | 9/2019 | Lin | G06K 9/3233 |
| 2019/0355366 A1* | 11/2019 | Ng | G10L 17/04 |
| 2020/0020165 A1* | 1/2020 | Tran | G06T 19/006 |
| 2020/0034436 A1* | 1/2020 | Chen | G06F 40/44 |
| 2020/0034948 A1* | 1/2020 | Park | G06T 3/4053 |
| 2020/0050202 A1* | 2/2020 | Suresh | G06K 9/00624 |
| 2020/0050893 A1* | 2/2020 | Suresh | G06T 7/194 |
| 2020/0053118 A1* | 2/2020 | Leng | H04L 63/0861 |
| 2020/0057805 A1* | 2/2020 | Lu | G06K 9/6277 |
| 2020/0065384 A1* | 2/2020 | Costello | G06F 40/30 |
| 2020/0082198 A1* | 3/2020 | Yao | G06K 9/6274 |
| 2020/0082224 A1* | 3/2020 | Sikka | G06K 9/6263 |
| 2020/0082264 A1* | 3/2020 | Guo | G06N 3/063 |
| 2020/0084427 A1* | 3/2020 | Sun | H04N 13/122 |
| 2020/0085382 A1* | 3/2020 | Taerum | G06N 3/0454 |
| 2020/0089755 A1* | 3/2020 | Shazeer | G06N 3/0454 |
| 2020/0089772 A1* | 3/2020 | Gomez | G06N 3/0454 |
| 2020/0090651 A1* | 3/2020 | Tran | G06N 3/0481 |
| 2020/0092556 A1* | 3/2020 | Coelho | H04N 19/96 |
| 2020/0098350 A1* | 3/2020 | Bengio | G10L 25/30 |

OTHER PUBLICATIONS

Torfi et al., "Text-Independent Speaker Verification Using 3D Convolutional Neural Networks", arXiv, Jun. 2018. (Year: 2018).*
Jung et al., "RawNet: Advanced end-to-end deep neural network using raw waveforms for text-independent speaker verification," Interspeech 2019, Sep. 15-19, 2019, Graz, Austria, pp. 1268-1272.
Shon et al., "Frame-Level Speaker Embeddings for Text-Independent Speaker Recognition and Analysis of End-to-End Model," Computer Science and Artificial Intelligence Laboratory, Massachusetts Institute of Technology, Cambridge, MA, Copyright © 2018 IEEE, pp. 1007-1013 (2018).

* cited by examiner

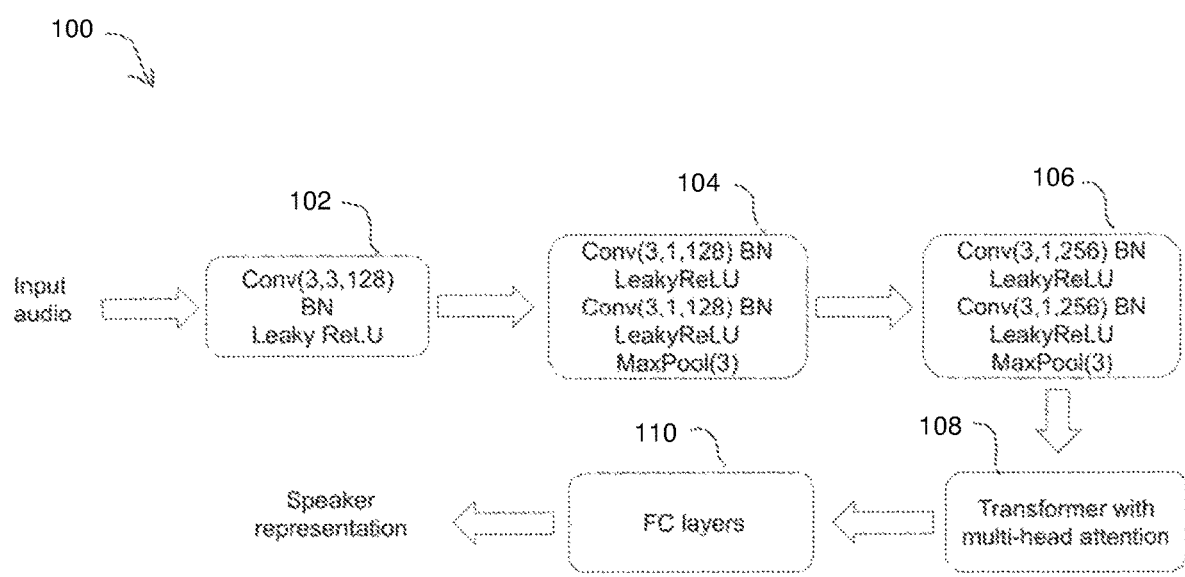
Figure 1A: Speaker Verification Architecture

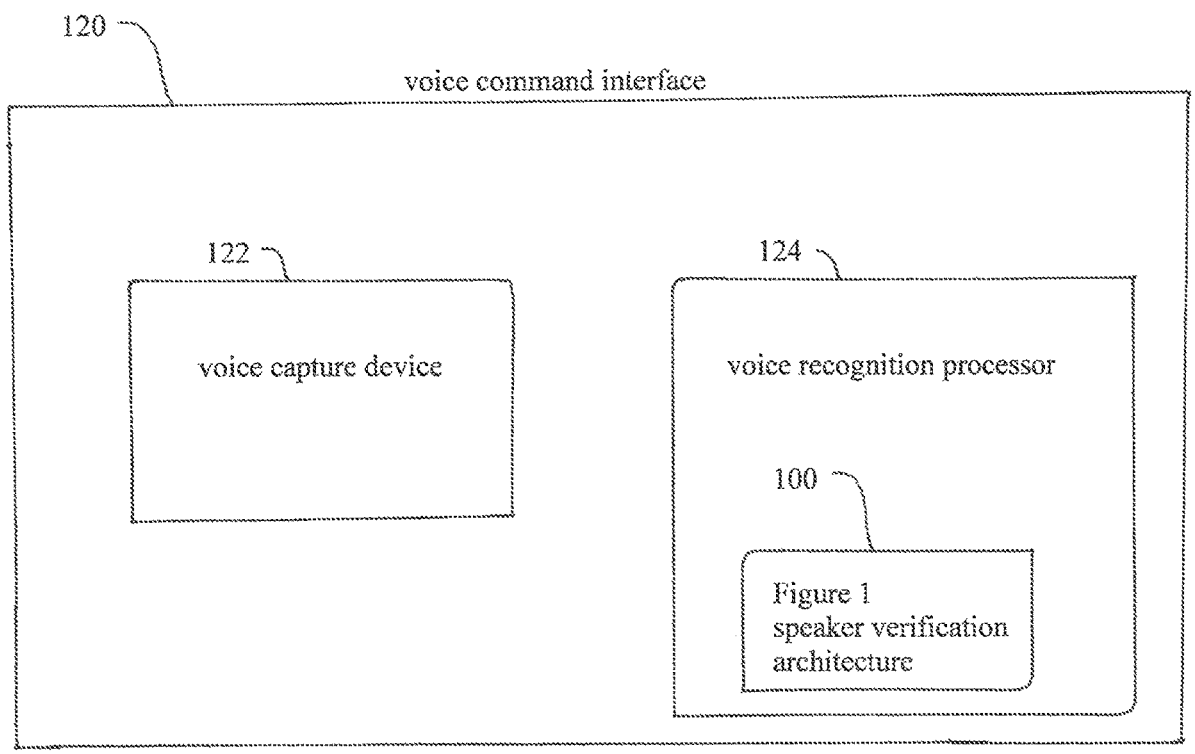
Figure 1B: Voice Command Interface

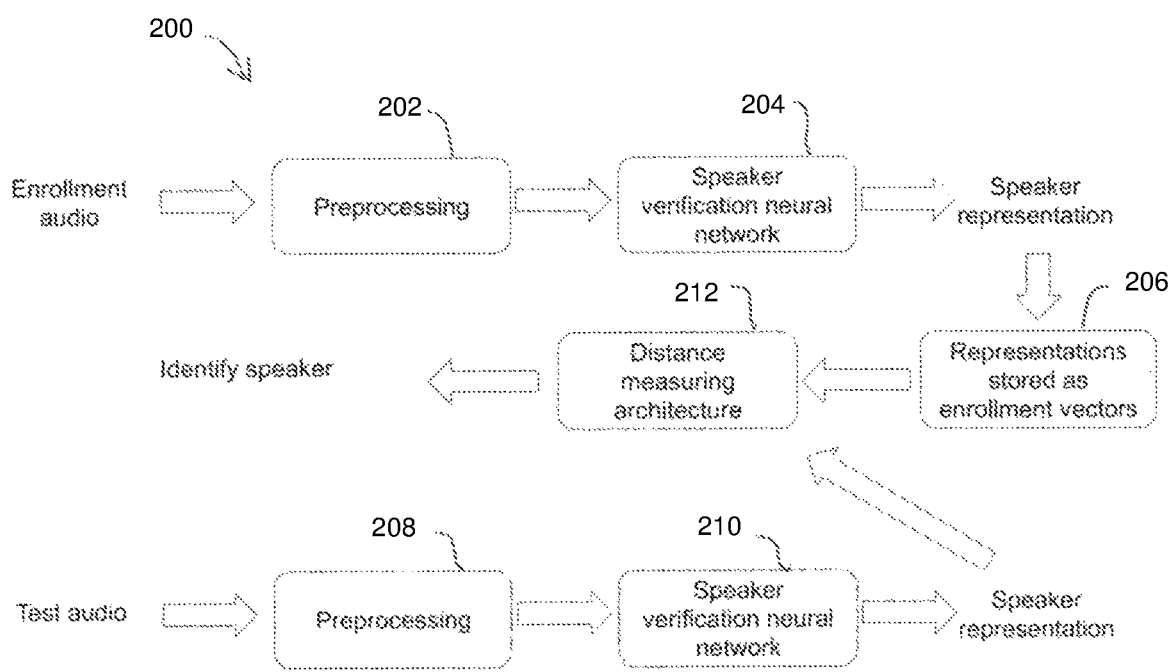
Figure 2: Enrollment and Test Process Flow Chart

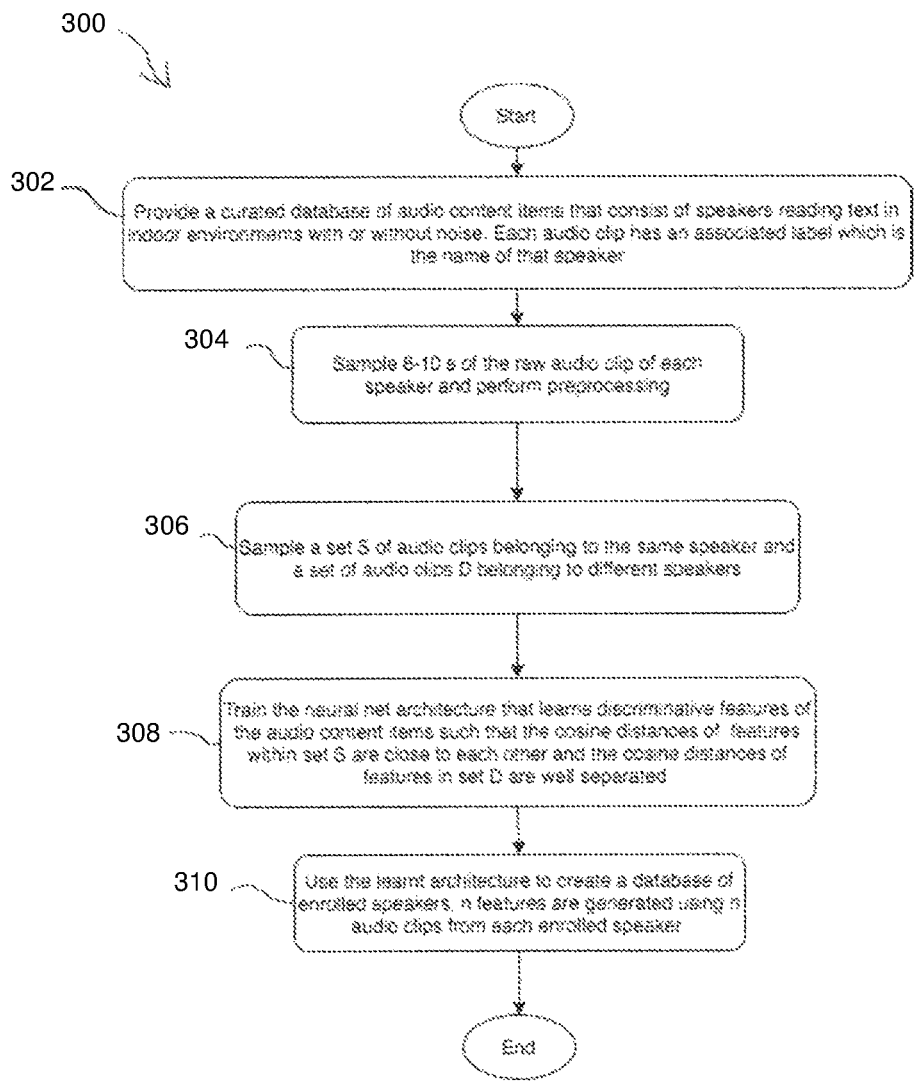
Figure 3: Training Flowchart

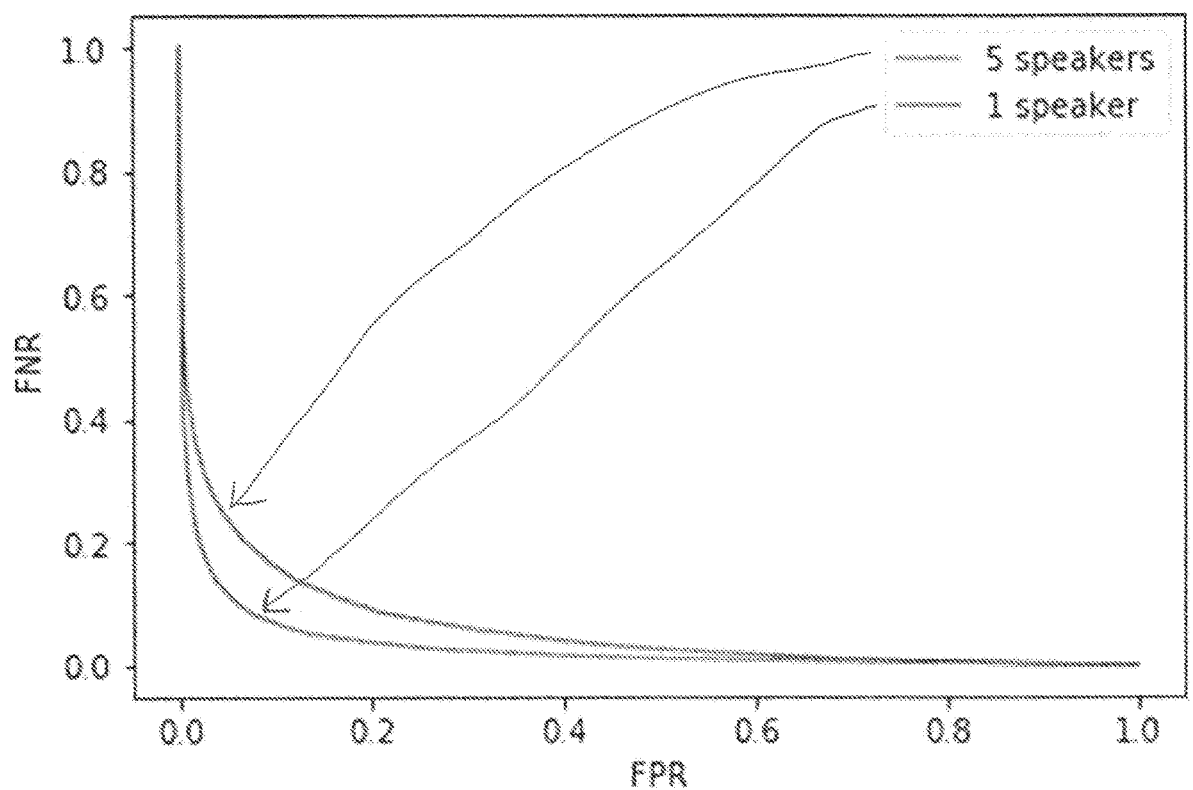
Figure 4: End-to-end runtime distribution in seconds

TEXT INDEPENDENT SPEAKER-VERIFICATION ON A MEDIA OPERATING SYSTEM USING DEEP LEARNING ON RAW WAVEFORMS

CROSS-REFERENCE TO RELATED APPLICATIONS

This application claims priority to U.S. Provisional Patent Application No. 62/954,130 filed Dec. 27, 2019, which is incorporated by reference herein.

BACKGROUND OF THE INVENTION

Speaker verification (SV) is the process of verifying, based on a speaker's known utterances, whether an utterance belongs to the speaker. The general procedure of speaker verification consists of three phases: development, enrollment, and evaluation. For development, a background model must be created for capturing speaker-related information. In enrollment, the speaker models are created using the background model. Finally, in the evaluation, the query utterances are identified by comparing to existing speaker models created in the enrollment phase.

Speaker verification can be categorized as text-dependent or text-independent. In text-independent SV, no restriction is imposed on the utterances. In text-dependent SV, all speakers repeat the same phrase. Text-independent SV is more challenging than text-dependent SV because the system that is detecting the utterances must be able to clearly distinguish between the speaker specific and non-speaker specific characteristics of the uttered phrases. However, text-independent SV is easier to use in the real world, and thus it is a preferred approach, especially if its performance (e.g., accuracy) can match that of text-dependent SV.

Direct modeling of raw waveforms using deep neural networks (DNNs) is now prominent in literature for a number of tasks due to advances in deep learning. Traditionally, spectrogram-based features with hand-tuned parameters were used for machine learning from audio. DNNs that directly input raw waveforms have a number of advantages over conventional acoustic feature-based DNNs. For example, minimization of pre-processing removes the need for exploration of various hyper-parameters such as the type of acoustic feature to use, window size, shift length, and feature dimension.

Despite the myriad of proposed DNN architectures for speaker verification, there is a still a need for new DNN architectures for speaker verification that work with raw audio waveforms. The present invention fulfills this need.

SUMMARY OF THE PRESENT INVENTION

One preferred embodiment of the present invention provides an artificial neural network architecture executable on one or more computer processors for processing raw audio waveforms to create speaker representations that are used for text-independent speaker verification and recognition. The artificial neural network architecture includes a strided convolution layer, a first and second residual block, a transformer layer, and a final fully connected (FC) layer. The strided convolution layer has an input and an output. The input of the strided convolution layer is configured to receive raw audio waveforms from a speaker. The first residual block has an input and an output. The input of the first residual block is configured to receive an output of the strided convolution layer. The second residual block has an input and an output. The second residual block is connected sequentially to the output of the first residual block. The first and the second residual blocks both include multiple convolutional and max pooling layers. The transformer layer has an input and an output. The input of the transformer layer is connected to the output of the second residual block. The transformer layer is configured to aggregate frame level embeddings to an utterance level embedding. The final FC layer has an input and an output. The input of the FC layer is connected to the output of the transformer layer. The output of the FC layer creates a speaker representation for the speaker whose raw audio waveforms were inputted into the strided convolution layer.

Another preferred embodiment of the present invention provides a voice command interface for an operating system (OS) of a media device that allows a plurality of different speakers to be independently recognized when entering voice commands into the interface. The voice command interface includes a voice capture device, and a voice recognition processor. The voice recognition processor includes the artificial neural network architecture that was summarized above. The media device may be a smart television or a smart multi-media player device, and the media OS may be an OS for a smart television OS or an OS for a smart multi-media player device.

BRIEF DESCRIPTION OF THE DRAWINGS

Preferred embodiments of the present invention will now be described by way of example with reference to the accompanying drawings:

FIG. 1A shows speaker verification architecture in accordance with one preferred embodiment of the present invention.

FIG. 1B shows a voice command interface for a media operating system in accordance with one preferred embodiment of the present invention.

FIG. 2 is a flowchart of an enrollment and test process in accordance with one preferred embodiment of the present invention.

FIG. 3 is a training flowchart for implementing one preferred embodiment of the present invention.

FIG. 4 shows a graph of performance testing results when using a preferred embodiment of the present invention.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

media device—A media device is any device that outputs media content, such as a television, radio, smartphone, or computer. A media device thus allows for consumption of media content.

Examples of media devices that output both video-based media content and audio-based media content include a smart TV, smartphone, and a smart multi-media player device.

II. Overview

Preferred embodiments of the present invention provide a deep learning architecture (also, referred to herein as an "artificial neural network architecture" or "speaker verification (SV) architecture") for several applications around speaker verification, including speaker diarization and target voice separation. (Speaker diarization is the process of partitioning an input audio stream into homogeneous segments according to the speaker identity.) A deep neural network is trained to perform well in the presence of noise in an indoor environment setting when a user is interacting with a media Operating System (OS), such as a TV OS. This network generates a good text-independent representation of a speaker from raw audio which can then be used to verify a particular speaker from a set of speakers in the household or for other downstream tasks.

The idea of training a deep neural network for speaker verification was largely motivated by the development of an audio-based interactive front-end for a TV OS developed by Alphonso Inc., Mountain View, Calif. The TV OS is intended to be used in a household where n speakers are assumed to live (n<=10). A real-time speaker verification architecture can help uniquely identify speakers in a household and tailor show recommendations and features in the TV OS for that user. End-to-end learned features from raw audio can further improve performance for downstream tasks in the presence of multiple speakers. These include speaker diarization, namely, the problem of "who spoke when" and targeted voice separation that separates the voice of a target speaker from multi-speaker signals.

Learning good representations for speakers that use media devices (e.g., TV) is very important to media analytics and measurement companies, such as Alphonso Inc. It enables such companies to use the representations for several downstream tasks, whether the task is to provide audience engagement and recommendations, or to provide deeper insights into consumer behavior, or to build an improved user interaction interface. The SV architecture for speaker verification described herein can be trained for related downstream tasks in an end-to-end fashion. The SV architecture is used to learn speaker representations from raw audio in the presence of indoor environmental noise. The SV architecture may also be incorporated into a media OS (e.g., TV OS) as an application for n speaker verification and n speaker classification that works in an indoor household environment. The SV architecture also introduces an end-to-end architecture that incorporates speech denoising into speaker verification. Furthermore, end-to-end training for downstream tasks include speaker diarization and target speaker separation.

The metric used for SV has traditionally been the Equal Error Rate (EER) where two utterances from the speaker dataset are compared and classified as belonging to the same speaker or not using several thresholds. EER corresponds to the error rate at the threshold where the false acceptance and the false rejection rates are equal. The present embodiment involves n speaker verification, as well as distinguishing among the n speakers in a household. Accuracy is used as a metric to distinguish between the n speakers. The n speaker EER is provided in addition to the two speaker EER.

III. Detailed Description

A. Model Architecture

FIG. 1A shows speaker verification architecture in accordance with one preferred embodiment of the present invention. The speaker verification architecture is implemented with artificial neural network architecture 100 that is executable on one or more computer processors (not shown) for processing raw audio waveforms (labeled as "Input audio") to create speaker representations that are used for text-independent speaker verification and recognition. The artificial neural network architecture 100 includes the following successively connected layers and blocks:

- strided convolution layer 102;
- first residual block 104;
- second residual block 106;
- transformer layer 108; and
- final fully connected (FC) layer 110.

The strided convolution layer 102 is configured to receive raw audio waveforms from a speaker. The input of the first residual block 104 is configured to receive an output of the strided convolution layer 102. The second residual block 106 is connected sequentially to the output of the first residual block 104. The first and the second residual blocks 104 and 106 both include multiple convolutional and max pooling layers, as well as batch normalization and Leaky ReLU (rectified linear unit) as the activation function. The input of the transformer layer 108 is connected to the output of the second residual block 106. The transformer layer 108 is configured to aggregate frame level embeddings to an utterance level embedding. The input of the final FC layer 110 is connected to the output of the transformer layer 108. The output of the final FC layer 110 creates a speaker representation for the speaker whose raw audio waveforms were inputted into the strided convolution layer 102.

The architecture of FIG. 1A is trained using Voxceleb2 dataset.

Another preferred embodiment of the present invention provides a voice command interface for an operating system (OS) of a media device that allows a plurality of different speakers to be independently recognized when entering voice commands into the interface. The voice command interface includes a voice capture device, and a voice recognition processor. The voice recognition processor includes the artificial neural network architecture that was summarized above. The media device may be a smart television or a smart multi-media player device, and the media OS may be an OS for a smart television OS or an OS for a smart multi-media player device.

FIG. 1B shows a voice command interface 120 for a media operating system in accordance with one preferred embodiment of the present invention. The voice command interface 120 includes voice capture device 122 and voice recognition processor 124. The output of the voice capture device 122 is received by the input of the voice recognition processor 124. The voice recognition processor 124 includes the artificial neural network architecture 100 described above.

FIG. 2 depicts a flowchart 200 of the enrollment and test process which uses the architecture of FIG. 1A. The enrollment process begins with the speaker providing an enrollment sample. The sample is first preprocessed (202) and then a speaker representation is extracted by passing it through the global background speaker verification neural network (204). These embeddings are stored in a database (206—Representations stored as enrollment vectors). In the test phase, when a speaker speaks, it is passed though the same pre-processing steps (208) and the global background model (210) to extract an embedding (Speaker representation). This embedding is then compared with the stored database of embeddings (206) using a cosine distance metric (212—Distance measuring architecture). The database embedding that it is closest to is identified to be the speaker.

B. Datasets

Noisy datasets improve the robustness of speaker representation vectors. Augmenting the training data with noises and reverberation is a highly effective strategy for improving performance in DNN embedding systems. In one preferred embodiment, VoxCeleb2 may be used for finetuning the architecture. The following additional datasets may be used to evaluate the model on.

1. VoxCeleb1: The front-end architecture attains an EER of 4.8% on the VoxCeleb1 test set. The architecture of the present invention achieves even lower EER on VoxCeleb1.
2. VoxCeleb2: The modified architecture was finetuned using VoxCeleb2 and the attention modules introduced were trained using this dataset. VoxCeleb2 included the entire VoxCeleb1 dataset as a testset.
3. Librispeech: The architecture of the present invention has an accuracy close to 100% on Librispeech. The general consensus in literature is that Librispeech is a less noisy and therefore easier dataset than Voxceleb1 and Voxceleb2.
4. Mozilla: This is currently the largest open source dataset for audio recognition tasks. This dataset is currently not curated and as a result, wide differences in length distribution and quality of clips was observed. Clips <2 s and >12 s were eliminated and the high accuracy of the modified architecture was retained.
5. Alphonso indoors dataset: The architecture of the present invention is intended to be used in an indoor environment where the noise distribution is predominantly composed of TV noise, household noise and people talking over one another. This dataset of audio clips was manually collected and curated from Alphonso employees. Employees contributed clean and noisy clips of 2 min each which were then clipped to 10 s for training and testing.

C. Training Pipeline

FIG. 3 shows a training flowchart 300 in accordance with one preferred embodiment of the present invention. The training flowchart includes the following steps:

302: Provide a curated database of audio content items that consist of speakers reading text in indoor environments with or without noise. Each audio clip has an associated label which is the name of that speaker.
304: Sample 8-10 s of the raw audio clip of each speaker and perform preprocessing.
306: Sample a set S of audio clips belonging to the same speaker and a set of audio clips D belonging to different speakers.
308: Train the neural network architecture that learns discriminative features of the audio content items such that the cosine distances of features within set S are close to each other and the cosine distances of features in set D are well-separated.
310: Use the learned architecture to create a database of enrolled speakers. n features are generated using n audio clips from each enrolled speaker.

D. Testing Pipeline

The task is to predict which speaker among the list of $num_enrol$ enrolled speakers a given test clip belongs to. ($num_enrol$ is a variable) Accuracy was evaluated as the ratio of total number of predictions that were correct to the total number of predictions made. Variations of two kinds are introduced:

1. Vary the $num_enrol$ speakers selected (i.e., select a different subset of speakers). This is repeated $num_iter$ times. ($num_iter$ is a variable)
2. Vary the clips selected to enroll each speaker. Each speaker is enrolled with 1 clip and a different clip is used in the next iteration to enroll the same speaker. This is repeated $enroll_iter$ times. ($enroll_iter$ is a variable)

E. Preprocessing

In one preferred embodiment, all audio files were converted using ffmpeg to mono (single stream), 16 kHz sampling rate and PCM signed 16-bit little endian. Voice activity detection (VAD) using webrtcvad was applied next and the clip size truncated so that the duration of all clips was between 5-7 s. If a test clip is too short (e.g., <2 s), the reversed audio clip is attached to the same audio clip to increase clip length.

F. Results

Two measures of performance are reported—accuracy and EER.

i. Accuracy

Accuracy is defined as the percentage of test audio clips that are correctly matched to an enrolled speaker given that all the test clips belong to speakers enrolled in the system. The accuracy is reported that the model attained on all the datasets that the model was tested on. The accuracy is reported using 500 outer iterations, 5 enrollment iterations, 5 number of speakers and 1 enrollment.

1. VoxCeleb1 (VoxCeleb2 test): 93.23±4.25%
2. VoxCeleb2: 93.25±4.91%
3. Librispeech: 99.23±1.65%
4. Mozilla: 96.18±5.10%
5. Alphonso indoors dataset: 92.82±4.68% ii. EER

This is the metric that is reported in academic literature to evaluate speaker verification systems. Both 2 speaker EER and 5 speaker EER have been evaluated on the VoxCeleb2 dev set. The EER can be used to pick a threshold that balances false positive rate (FPR) and false negative rate (FNR) for the present application, namely, to determine if a test audio sample belongs to one of the speakers enrolled in the system.

FIG. 4 shows test results for 1 speaker and 5 speakers.

For two speaker EER, 5000 points are picked. The points consist of 2500 positive points and 2500 negative points. Each point comprises of two speaker clips. In a positive point both clips are from the same speaker, while in a negative point both clips are from different speakers.

For n speakers (e.g., 5 speaker EER), 5000 points are picked. Each point comprises of six speaker clips—a test clip and five enrollment clips. In a positive point the test clip was produced by one of the five speakers enrolled, while in a negative point the test clip is from a speaker outside of the five enrolled speakers.

For deployment setup and benchmarking, the median wall clock time for a forward pass was 0.06 sec. The median wall clock time for loading the graph and model weights was 1.8 sec. The runtime benchmarking was done on a Nvidia GeForce 1080 GPU.

G. Conclusion

The present invention described above provides a deep learning architecture for speaker verification. The network was trained to perform well in the presence of noise. An end-to-end network was used that generates a text-independent representation of a speaker from raw audio.

The present invention may be implemented with any combination of hardware and software. The present invention can also be included in an article of manufacture (e.g., one or more non-transitory, tangible computer program products) having, for instance, computer readable storage media. The storage media has computer readable program code (program instructions) stored therein that is encoded with instructions for execution by a processor for providing and facilitating the mechanisms of the present invention, particularly, the elements shown in FIGS. 1A and 1B, and the steps shown in FIGS. 2 and 3. The article of manufacture can be included as part of a computer system.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above. The storage media may also be implemented via network storage architecture, wherein many devices, which are paired together, are available to a network.

The processor(s)/computer(s) used to implement the elements shown in FIGS. 1A and 1B, and to perform the steps shown in FIGS. 2 and 3, are not a general-purpose computers, but instead are specialized computer machine that perform a myriad of functions shown in these figures that are not native to a general-purpose computer, absent the addition of specialized programming.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An artificial neural network architecture executable on one or more computer processors for processing raw audio waveforms to create speaker representations that are used for text-independent speaker verification and recognition, the artificial neural network architecture comprising:
   (a) a strided convolution layer having an input and an output, the input of the strided convolution layer configured to receive raw audio waveforms from a speaker;
   (b) a first residual block having an input and an output, the input of the first residual block configured to receive an output of the strided convolution layer, the first residual block including multiple convolutional and max pooling layers;
   (c) a second residual block having an input and an output, the second residual block being connected sequentially to the output of the first residual block, the second residual block including multiple convolutional and max pooling layers;
   (d) a transformer layer having an input and an output, the input of the transformer layer being connected to the output of the second residual block, the transformer layer configured to aggregate frame level embeddings to an utterance level embedding; and
   (e) a final fully connected (FC) layer having an input and an output, the input of the FC layer being connected to the output of the transformer layer, the output of the FC layer creating a speaker representation for the speaker whose raw audio waveforms were inputted into the strided convolution layer.

2. A voice command interface for an operating system (OS) of a media device that allows a plurality of different speakers to be independently recognized when entering voice commands into the interface, wherein the voice command interface comprises:
   (a) a voice capture device; and
   (b) a voice recognition processor, the voice recognition processor including an artificial neural network architecture executable on one or more computer processors for processing raw audio waveforms to create speaker representations that are used for text-independent speaker verification and recognition, the artificial neural network architecture comprising:
      (i) a strided convolution layer having an input and an output, the input of the strided convolution layer configured to receive raw audio waveforms from a speaker;
      (ii) a first residual block having an input and an output, the input of the first residual block configured to receive an output of the strided convolution layer, the first residual block including multiple convolutional and max pooling layers;
      (iii) a second residual block having an input and an output, the second residual block being connected sequentially to the output of the first residual block, the second residual block including multiple convolutional and max pooling layers;
      (iv) a transformer layer having an input and an output, the input of the transformer layer being connected to the output of the second residual block, the transformer layer configured to aggregate frame level embeddings to an utterance level embedding; and
      (v) a final fully connected (FC) layer having an input and an output, the input of the FC layer being connected to the output of the transformer layer, the output of the FC layer creating a speaker representation for the speaker whose raw audio waveforms were inputted into the strided convolution layer.

3. The system of claim 2 wherein the media device is one of a smart television, and a smart multi-media player device, and the media OS is one of an OS for a smart television OS, and an OS for a smart multi-media player device.

\* \* \* \* \*